June 5, 1956 W. H. CONNELL 2,748,541
EDGE GRINDING OPTICAL LENSES
Filed Feb. 5, 1953 3 Sheets-Sheet 1

Inventor
Wade H. Connell
By Williamson, Williamson, Schroeder & Adams
Attorneys

June 5, 1956 W. H. CONNELL 2,748,541
EDGE GRINDING OPTICAL LENSES
Filed Feb. 5, 1953 3 Sheets-Sheet 2

Inventor
Wade H. Connell
By
Williamson, Williamson, Schroeder, & Adams
Attorneys June 5, 1956 W. H. CONNELL 2,748,541
EDGE GRINDING OPTICAL LENSES
Filed Feb. 5, 1953 3 Sheets-Sheet 3
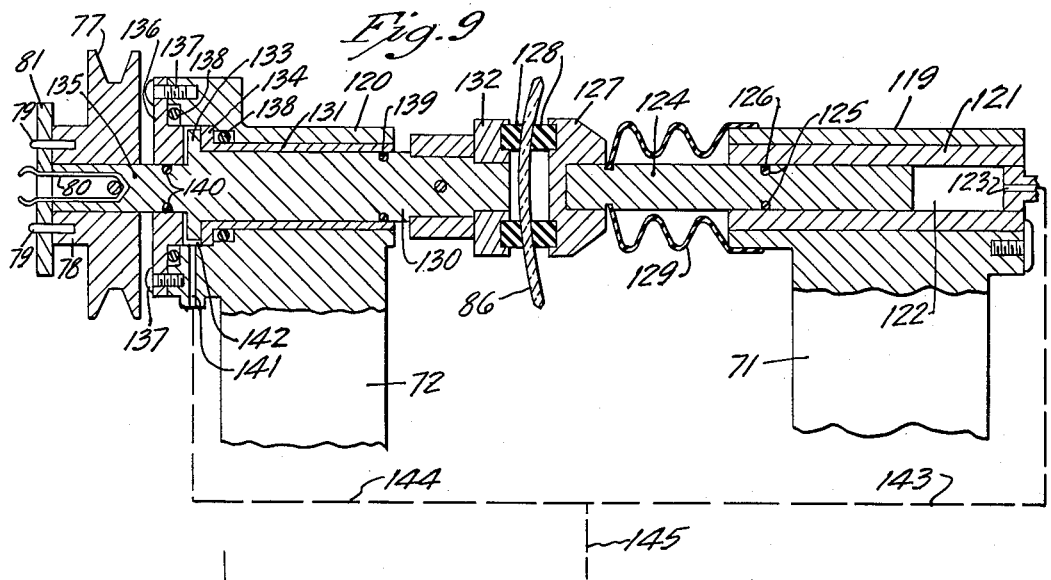
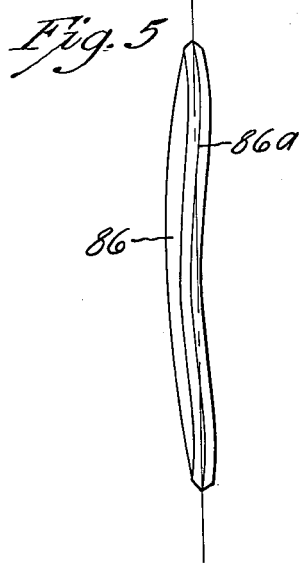
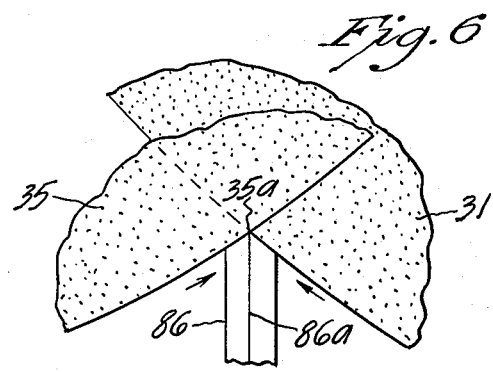
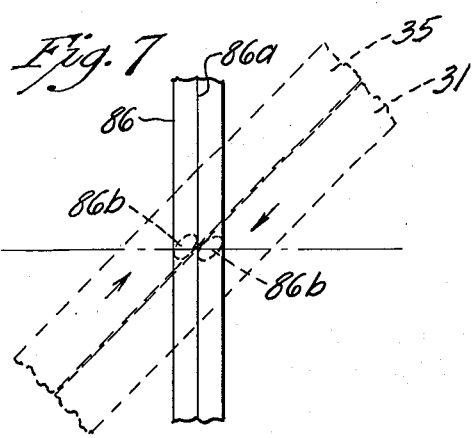
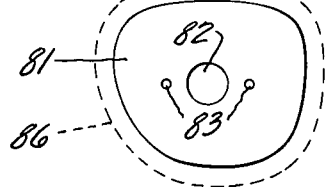
Inventor
Wade H. Connell
By Williamson, Williamson, Schroeder & Adams
Attorneys

United States Patent Office 2,748,541
Patented June 5, 1956

2,748,541
EDGE GRINDING OPTICAL LENSES
Wade Hampton Connell, Duluth, Minn.

Application February 5, 1953, Serial No. 335,318

9 Claims. (Cl. 51—101)

This invention relates to edge grinding optical lenses and more particularly to an apparatus and method for forming under automatic control a desired configuration at the peripheral edge of the lens.

A number of apparatuses have been devised to edge optical lenses and some have been improved for applying bevels thereto. None of these old devices, however, to the best of my knowledge, satisfactorily account for the sinuous variation or compound curvature about the peripheral edge of a lens, nor do they automatically time and guide the cutting down to the final desired edge. Many of these prior art devices are primarily machines for assisting, to different degrees, hand operations requiring considerable special skill in grinding the edges in a variety of sizes and shapes. The more common class of lenses which are thus treated are the ophthalmic lenses. It is well known that the contours and shapes of lenses characterized by this class are of infinite variety and, hence, the treatment thereof cannot be simply standardized in an edging device, but, on the other hand, must require special provision to follow the complex curves during grinding of their edges.

One problem which arises is to apply an evenly formed dual bevel having its apex substantially centered with respect to the thickness of the lens at its edge, and yet having the bevel uniformly follow the sinuous curvature of the lens all the way around the periphery. This dually beveled edge is commonly employed for secure mounting of an ophthalmic lens within the rims of ordinary spectacles or eye glasses and may also be effectively used in the case of lenses adapted to be mounted in other optical instruments. Obviously, it is desirable that the lens always be rigidly mounted against even the slightest displacement in order that the functioning of an optical system be properly preserved and that the lens itself does not become dislodged or lost.

It is, therefore, an important object of this invention to provide for an automatic apparatus and method of lens edging which will effectively and accurately grind the edges of an optical lens in a guided manner so as to conform to and/or determine the peripheral shape of the lens.

Another important aspect of my invention involves controlling the speed of relative revolution between the lens or workpiece and a rotating grinding means. I have found that it is possible to acquire an excellent finished grinding job in a much shorter time by speeding up the operation at those portions where the initial rough irregularities of the work piece are already eliminated and the predetermined configuration is approached. It is, therefore, another important object of the invention to provide for control means responsive to automatically limited guide mechanism which, in turn, will define the approach of a revolving workpiece relative to the rotating cutting portion of a tool element, the control means causing the workpiece to turn faster in those regions at or nearing completion. Thus, where a rough lens blank or workpiece has, for example, a continuous portion of its peripheral edge formed closer to its ultimate finished configuration than the remaining portion, then as the device revolves the workpiece relative to the rotating grinding mechanism, a position will be momentarily reached at one of the revolutions where the final guided configuration is reached or approached within a predetermined minimum distance. During the short period this minimum distance is maintained, the driving speed of revolution of the workpiece will be increased. At each revolution, the increased speed period will be lengthened until the specificed continuous portion is being hurried through its part of the cycle. As a converse result of the increased rate of travel, the rate of cutting or grinding will be less at this portion and similarly the depth of cut will be less per revolution. Since, at the specified portion, all protuberances and grooved areas have been eliminated, the increased speed will not be harmful to the workpiece. The remaining portions of the lens having the greater margins will thus have a slower rate of travel, and therefore will be cut down faster at each revolution of the workpiece, with the net result that the entire periphery will be finished at approximately the same time. The total time for the whole operation will have been cut down since non-productive time is minimized while useful grinding may be accomplished continuously substantially throughout the entire grinding operation.

Another object of the invention is to provide for edge grinding a relatively revolving lens in which a pair of rotating grinding discs operate in close clearance for simultaneously applying grinding pressure to both sides of a peripheral edge of a lens which is angulated with respect to the discs in a preselected position, that is, with the centers of pressure at the grinding contact being in aligned relation, the alignment thereof being substantially parallel to the axis of rotation of the lens.

In the case of an ophthalmic lens or other lenses having a peripheral edge which does not lie in one plane, the edge will wave in and out of a mean plane in compound curvature, or so as to define a sinuous line. To the best of my knowledge, previous edging devices for such lenses have not satisfactorily produced a uniform bevel which will firmly hold the lens in a rim or mount. In particular, edges of a dual bevel formed by these old devices will have variations in the angle of bevel, off-center position of the apex formed by the dual bevel, and in the case of single element edge grinders having a dressed groove therein, the groove quickly wears unevenly and the shape of the bevels ground upon the lens each becomes rounded and irregular, as a number of consecutive lenses are being edge ground.

It is, therefore, a further object of my invention to provide for a lens grinding device in which the lens is revolved against the circular edges of a pair of closely overlapping abrasive discs at the apex formed by their converging circumferences, the axis of the revolving lenses being radially controlled to follow in grinding contact with the apex according to the sinuous curvature at the peripheral edge of the lens. A particularly important result of my invention is to minimize or eliminate the necessity of dressing the circular abrasive discs since they are self-dressing during their wear and will cut uniformly excellent edges and bevels upon a multiplicity of consecutively treated lenses.

Another object of the invention is to provide for an economical method of similarly forming forward and rearward beveled edges on an irregularly curved edge of an optical lens where the form of the beveled edge will automatically follow the curvature thereof and the final configuration of the lens will be predetermined during continuous operation of the machine.

These and other objects and advantages of my invention will more fully appear from the following description made in connection with the accompanying drawings wherein like reference characters refer to similar parts throughout the several views and in which:

Fig. 5 is an enlarged edge view of an optical lens blank having a compound curvature and sinuous edge;

Fig. 6 is an enlarged segmental top view of the apex of the peripheral edges of the abrading discs and showing the portion of the lens edge which is being ground in contact therewith;

Fig. 7 is an enlarged and somewhat diagrammatic horizontal view of the forward edge of the lens being ground and with the position of the abrading discs at their point of contact with the lens being indicated in dotted lines;

Fig. 8 is an enlarged side elevation of a cam guide which may be employed on the work holding mechanism so as to define the peripheral shape to be ultimately assumed by the ground lens, the latter being shown in dotted line; and Fig. 9 is an enlarged vertical sectional view of an alternative form of spindle to that shown in Fig. 4, the source of hydraulic pressure being indicated diagrammatically.

Figure 1:
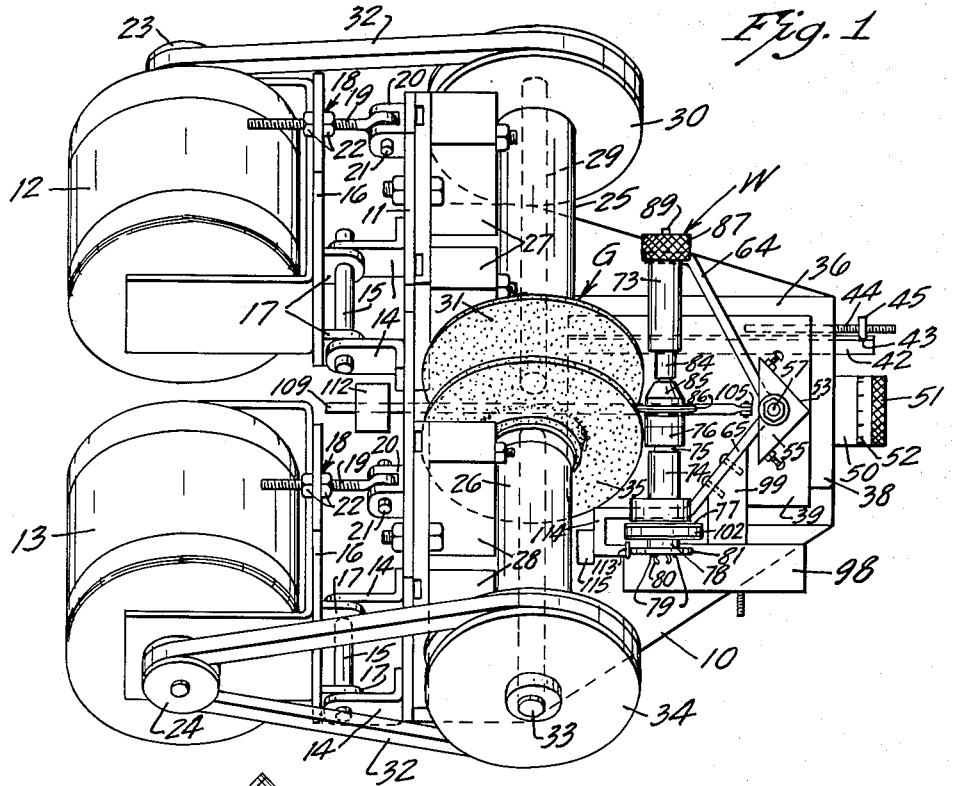
Fig. 1 is a top plan view of my device with an optical lens blank in edge grinding position.
Figure 2:
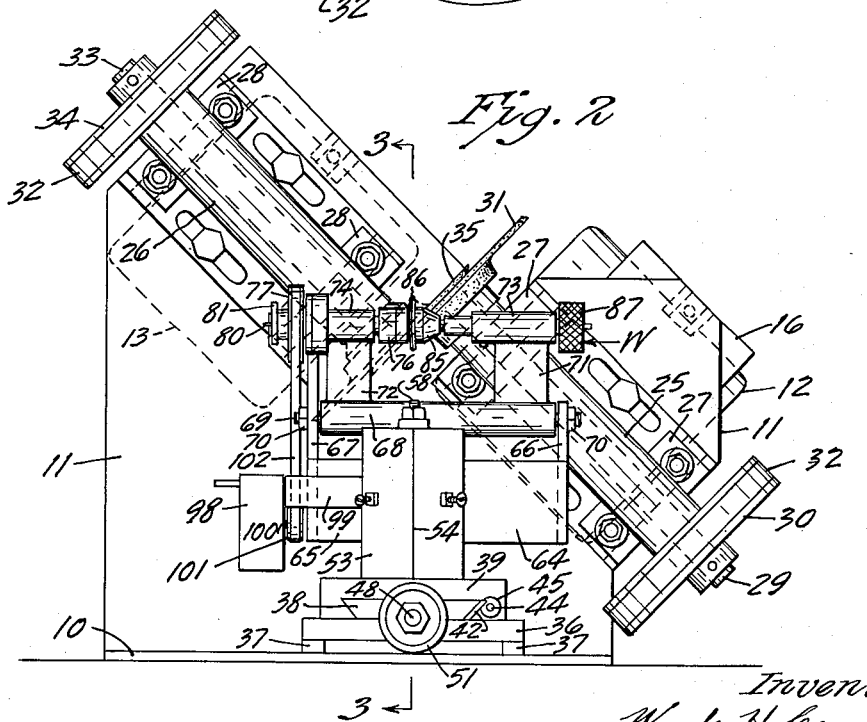
Fig. 2 is a front elevational view of the device shown in Fig. 1.

Referring now more particularly to the drawings the edge grinding apparatus is shown in its entirety in Figs. 1 and 2. The device has a base 10 to which is rigidly attached an upstanding plate 11 for the mounting of motors 12 and 13. Two pairs of brackets 14 extend rearwardly in spaced relation from the plate 11 and each bears a pivot pin 15 thereacross. A motor mounting plate 16 bears a similar pair of cooperating brackets 17 which are adapted to lie in spaced relation between the brackets 14 and are likewise pivoted to the pin 15. Each motor mount 16 is adjustably secured in position, through a threaded connection 18, to an eye bolt 19, the eye bolt being pivotally mounted on a U-bracket 20 secured to the rear of plate 11 and having a cross pin 21 at said pivoted connection. The threaded connection 18 comprises a pair of nuts 22 which are rotatably mounted at the mounting plate 16 for adjusting the position of motor 12 and its mounting plate 16 relative to the upstanding plate 11. The motor 13 is offset in its alignment with motor 12 and has the identical mounting parts as those just described for holding it in mounted position upon the upstanding plate 11 in the relative positions shown in Figs. 1 and 2. Each of the motors 12 and 13 has a driving pulley attached to its axial shaft, the motor 12 being provided with a downwardly disposed driving pulley 23 and the motor 13 having an upwardly disposed driving pulley 24.

Mounted to the front of the upstanding plate 11 are a pair of journals, the lower elongated journal 25 being disposed in generally parallel relation with the upstanding plate 11 and with the axis of motor 12 while the upper elongated journal 26 is similarly disposed with relation to the upstanding plate 11 and the axis of its driving motor 13. The journals may be secured adjustably to the plate 11 by such bolted means as spacing blocks 27 for the journal 25 and blocks 28 for the journal 26.

A shaft 29 is rotatably and axially mounted within the journal 25 and bears at its lower end the sheave or pulley 30 and a circular abrasive disc 31 at its upper end. The shaft 29, as well as the axis of motor 12, are angulated with respect to the horizontal base 10 to a pronounced degree, in the neighborhood of 45 degrees for the specific conditions set forth, but variable with other conditions in order to accomplish the end results of the invention, as will be more fully set forth as this specification progresses. The sheave 30 is aligned with the driving pulley 23 and a link such as V-belt 32 furnishes a means for imparting rotation of motor 12 to the pulley 30, the shaft 29, and the abrasive disc 31. The journal 26 has a comparable shaft 33 rotatably and axially mounted therein with the pulley 34 secured to its upper end and an abrasive disc 35 axially secured to its lower end. The shafts 29 and 33 are mounted within their respective journals 25 and 26 so as to avoid end play during rotation. The abrasive circular discs 31 and 35 comprise a cooperative cutting or grinding means G and are positioned in close clearance with one another, their opposed areas lying in overlapping relation. It will be noted that the circumferential peripheries of the circular discs 31 and 35 converge forwardly and rearwardly in overlapping relation to define an apex at each position. For practical reasons I prefer to work with the forwardly extending apex shown diagrammatically in Fig. 6, and in relation to the rest of the apparatus in Figs. 1 and 2. In order to obtain the very close clearance which I desire at the forward apex of these overlapping disc circumferences, I prefer to tilt the journals 25 and 26 to an almost imperceptible degree inwardly toward the upstanding supporting plate 11 at the respective positions where the discs 31 and 35 are mounted. This will, of course, cause the close clearance at the forward apex to be even closer than that at the rear apex. This small tilting will further result in operating clearance while still maintaining the circumferential peripheries in a very close relation at the forward apex for reasons to be later described.

It will also be observed that the journals 25 and 26 are misaligned so that the abrasive discs 31 and 35 overlap for only a part of their total areas. The degree of misalignment of the journals 25 and 26 will be apparent from viewing the apparatus from the front as in Fig. 2. Even though deliberately misaligned, the journals 25 and 26 define axes which are substantially parallel except for the above mentioned slight tilting relation. With the motors 12 and 13 mounted in driving connection with the pulleys 30 and 34, the adjusting nuts 22 at the threaded connections 18 may be turned so as to cause the mounting plates 16 together with the motors 12 and 13, mounted respectively thereon, to tilt backwardly and forwardly with respect to the upstanding mounting plate 11 to thereby tighten and loosen the drive belts 32.

The direction of rotation of my abrasive disc members 31 and 35 plays an important role in the invention. Although for some particular purposes I am able to rotate the discs in the same direction, for most practical purposes I prefer to rotate them in opposed directions. As will be later described I further prefer that the discs 31 and 35 rotate in opposed directions so that the forward apex, in contradistinction to the rearward apex near the upstanding mounting plate 11, will have the circumferential peripheries forming the said forward apex rotate in converging relation.

Figure 4:
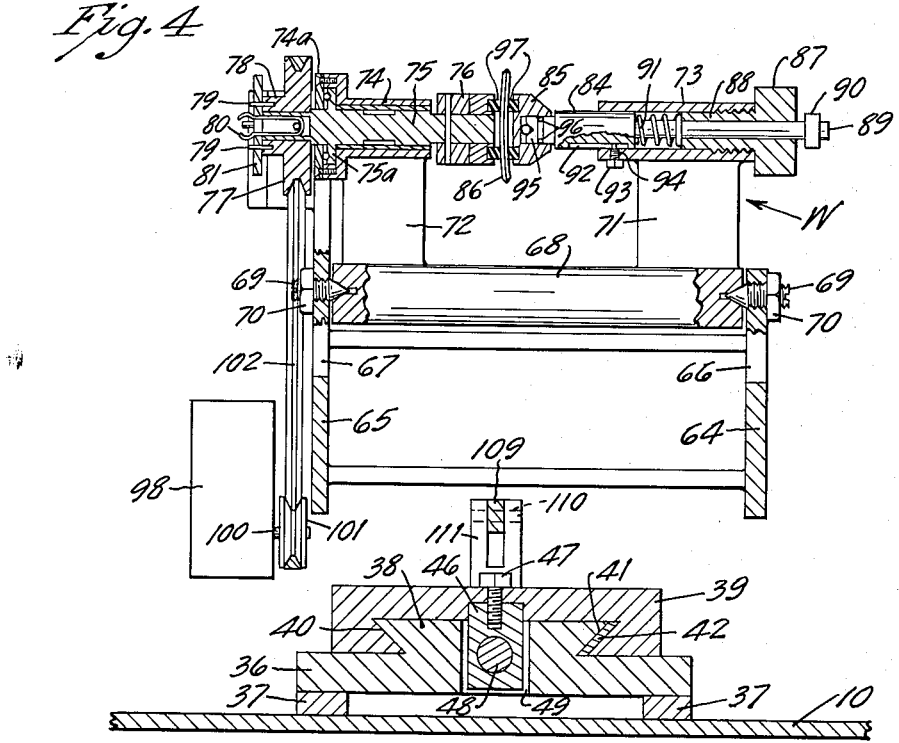
Fig. 4 is a vertical sectional view taken on the line 4—4 of Fig. 3, certain parts being shown in full line and others being broken away.
Figure 3:
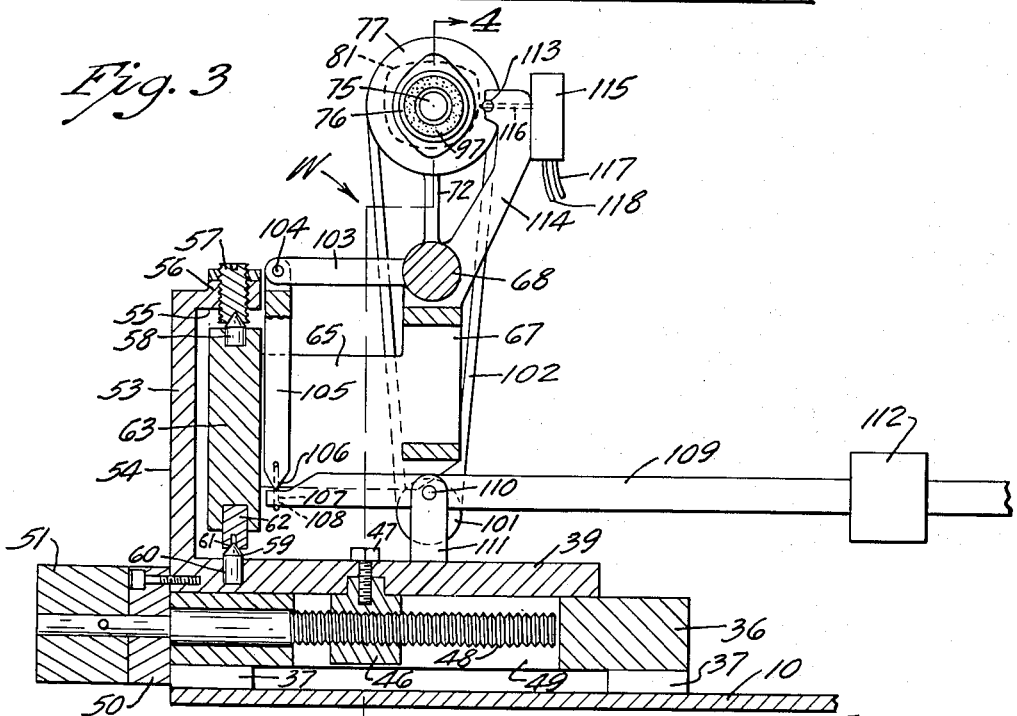
Fig. 3 is a vertical sectional view of the work holding mechanism alone, with an optical lens being mounted therein, taken on the line 3—3 of Fig. 2, certain portions being shown in full line and others broken away.

Also mounted on the base 10 is a work holding mechanism W. A platform 36 forms the sliding mount for the work holding mechanism W and is rigidly secured to base 10 through legs or spacers 37. The platform 36 has an outwardly flaring central guide member 38 over and about which is slidably mounted the base 39 of the work holding mechanism W. The base 39 is wedged against the upper longitudinal portion 38 of the platform 36 at the angular surface contact 40 and at a similar angular contact surface 41 at the opposite side as viewed in Fig. 4. An elongated wedging member 42 forms a shim for maintaining extremely close tolerances between the work holding base 39 and the platform 36. The wedging member 42 is a tapered bar and is provided with a slot or notch 43 near its outer end as shown in Fig. 1. A threaded stud member 44 is screwed into a tapped hole in the base 39 as shown in Figs. 1 and 2 and a nut 45 is positioned threadably on the stud 44 with an arcuate portion thereof engaging the slot 43 of the wedge shaped member 42. When the nut 45 is turned so as to progress towards the base 39 the wedging member 42 will advance and tighten the sliding engagement between the base 39 of the work holding mechanism W and the platform 36 rigidly attached to the main base member 10. A depending abutment 46, as viewed in Figs. 3 and 4, is rigidly attached to the underside of the work holding base 39 by such means as a stud bolt 47, a threaded bore being disposed longitudinally therethrough for engagement with an adjusting screw 48. The adjusting screw and the abutment 46 lie within and operate between the ends of a recess 49 disposed at the underside of base 39. A collar 50 is secured to the forward end of the platform 36 and forms a bearing for the forward end of screw member 48 against endwise thrust. The forwardmost end of the screw 48 is secured to a knurled adjusting knob 51 which may have a circular scale 52 disposed on the periphery thereof to measure fine adjustment of the work holding base 39 with respect to the fixed base 10 and platform 36. As the knurled nut 51 is turned, the abutment 46 will advance or retract within the slotted recess 49, thus causing the work holding base 39 to move forwardly or rearwardly while in snug sliding engagement with the upper flared portion 38 of the platform 36. It will be noted that the work holding base 39 is adjustable only in forward and backward relation in a plane parallel to the horizontal base 10.

Rigidly attached to the forward end of work holding base 39 is a standard 53 which is preferably in the form of a right angled member having its apex 54 centrally disposed with respect to the adjusting screw 48 and with its angular sides disposed rearwardly toward the mounting plate 11 in symmetrical relation therewith. The disposition of the standard 53 can best be seen in Figs. 1 and 2. The top of the angular standard 53 is bridged by a web 55 having a threaded boss 56 integral therewith. A set screw 57 is threadably positioned within the bore of the boss 56 and has a conical recess at the inner end thereof for thrust engagement with the conical end of stub shaft or bearing pin 58. A similar bearing pin 59 in base 39 is fixed in a socket 60 directly opposed to the set screw 57 and has an upwardly pointed conical end 61 for bearing engagement with the socketed pin 62. Both the bearing pin 58 and the socket pin 62 are fixed in axial alignment to a shaft 63, which is oscillable on its opposed bearings in vertical relation with the work holding base 39. Referring to Figs. 1 and 2, the shaft 63 has secured thereto in rearward relation with respect to the front of the device, a pair of diverging arms 64 and 65. The rearwardly extending ends of the arms are bent in parallel relation and have upstanding brackets 66 and 67 respectively. A shaft 68 is pivotally mounted across the brackets 66 and 67 and is journaled upon pins 69 threadably mounted through the ends of the brackets 66 and 67. Lock nuts 70 secure the bearing pins 69 in their adjusted position. Shaft 68 lies in horizontal parallel relation to the main base 10 and has rigidly secured thereto upstanding connectors 71 and 72 adjacent the ends of the shaft and in spaced relation with each other. The upper ends of the connectors 71 and 72 are rigidly attached to journal members 73 and 74 respectively. The journals 73 and 74 are in axially aligned relation, a shaft or spindle 75 being rotatably mounted within the journal 74 and having a work engaging chuck 76 at the inner end of spindle 75 and a pulley 77 beyond the outer end of journal 74. The spindle 75 has a circular flange member 75a which has roller bearing engagement against the journal cap 74a to prevent outward thrust of the spindle during rotation thereof. The spindle 75 extends outwardly through the pulley 77, which has a circular end face 78 upon which are rigidly formed a pair of pins 79, the spindle end having a spring detent 80 as shown in Figs. 1 and 4. Various cam members 81 may be removably mounted upon the end face 78 of pulley 77 and held for rotation with the spindle 75 by virtue of engagement with the detent 80 and the pins 79. The cam member is shown in detail in Fig. 8, being constructed of a narrow piece of material such as steel and having a medial opening 82 for engagement with the resilient detent 80 and spaced openings 83 for engagement with the outwardly extending pins 79.

The journal 73 has an axially aligned and opposing shaft or spindle 84 as shown in Figs. 2 and 4, the said spindle terminating in a cooperating chuck 85. The chuck 76 and the chuck 85 may be both supplied with resilient material for engagement with the medial opposed areas of a lens blank 86. A knurled knob 87 has a reduced threaded portion 88 which is threadably engaged with the outwardly extending end of the journal 73 as shown in the embodiment of Fig. 4. The knurled knob 87, together with its inward extension 88, has an annular passageway extending therethrough for slidably engaging a reduced and elongated axial extension 89 which is formed with or attached to the spindle 84. A portion of the elongated extension 89 extends beyond the knurled knob 87 and bears a key or collar 90 to limit the relative movement of the elongated axial extension 89 with respect to the knurled knob 87. A compression spring 91 is mounted within the cylindrical barrel of the journal 73 and is interposed between the end of the reduced portion 88 of the knurled knob 87 and the inside shoulder of the spindle member 84. The spindle 84 has a longitudinal groove 92 which is slidably engaged by the end of a set screw 93 which is in turn threadably inserted through a tapped opening 94 near the inner end of the journal 73. The chuck 85 is journaled for free rotation on the inward reduced end portion 95 of the spindle 84. Ball bearings 96 may serve to render the chuck 85 easily rotatable with respect to the spindle 84 even though under considerable pressure. The resilient contact by chuck 76 and chuck 85 with the lens blank 86 may be accomplished through resilient rings 97 mounted in annular grooves formed respectively at the opposed faces of the chucks 76 and 85.

A driving motor 98, such as an ordinary synchronous motor for actuating valves and the like, is mounted upon the bracket 99 which in turn is affixed to the arm 65. A driving shaft 100 extends inwardly from the motor 98 and bears a pulley 101 which is connected in driving relation with the pulley 77 through a belt 102. Although the pulley 77 oscillates through an arc with its center through the shaft 68, it will be observed by viewing Fig. 3 that the belt 102 will not be appreciably tightened or loosened if the pulley 77 does not swing substantially away from the position there shown.

The oscillating or arcuate movement of the pulley 77 together with the entire spindle arrangement mounted on shaft 68 is accomplished through a series of levers, the first of which is an arm 103 rigidly attached at a medial portion of the shaft 68 and extending forwardly thereof with respect to the entire lens grinding device. The arm 103 is pivotally secured at 104 to a downwardly extending arm 105. The pivot connection 104 allows for slight side play as well as radial movement of the arm 105 with respect to the arm 103. The lower end of arm 105 is pointed at 106 and terminates in a pin 107 which engages loosely an opening 108 through the end portion of the balance arm 109. The balance arm 109 is pivotally mounted at 110 to a pair of upstanding brackets 111 which are in turn affixed to the work holding base 39. An adjustable weight element 112 is slidably mounted at the forwardly extending portion of weight arm 109 so as to transmit rearward pressure to the spindle chucks 76 and 85 together with their interposed lens blank 86, the lens blank being in pressing engagement with the forward overlapping apex of the abrasive discs 31 and 35 as previously described.

The removable cam member 81 in Fig. 8, as representative of an infinite number of cams which could be designed for the delineation of the outward form of the lens blank, is in alignment with an abutment 113 formed at the top of a standard 114 which in turn is mounted rigidly to the arm 65 as shown in Fig. 1. The abutment 113 may be formed in a U-shape at the top of standard 114 so as to constitute a protective guard for the pulley 77 as shown in Fig. 1. Mounted at the rear of the abutment 113 is a microswitch 115 having another abutment or pin actuator 116 extending forwardly through abutment 113 in slidable engagement therewith as in Fig. 3. The forward end of the pin abutment 116 normally extends forwardly of the fixed abutment 113 and may be adjusted by means not shown to actuate the microswitch 115 when it is depressed toward the microswitch 115 to a predetermined position. The cam 81 can therefore engage either the microswitch pin abutment 116 alone or both of the abutment members 116 and 113. Leads 117 and 118 are shown in part in Fig. 3, it being understood that the movement of the abutment pin 116 forwardly from the microswitch 115 will actuate electrically a circuit through the leads 117 and 118 in connection with the synchronous motor 98 in a well known manner to operate the motor at a lower speed when the abutment pin 116 is in an outwardly position and at a higher speed when the abutment pin 116 is depressed inwardly toward the microswitch 115 to a predetermined adjustable degree.

An alternate form of the spindle arrangement is shown in Fig. 9. The object of this alternate arrangement is to hydraulically relieve the end thrust upon the spindle members and to provide for firm engagement of the lens blank 86 while still providing a free floating and well-lubricated spindle. The alternate form embodies the same supporting members 71 and 72 to which are secured bearing members 119 and 120, the latter being modified somewhat over the bearing members 73 and 74 of Fig. 4. Bearing 119 is provided with a sleeve member 121 having a central uniform bore 122 and a restricted opening at the outer end 123. A free floating shaft 124 fits closely within the bore 122 and is provided intermediate its ends with a groove 125 which retains an oil sealer such as O-ring 126. The shaft 124 is rotatable within the bore 122 and also may be reciprocated outwardly and inwardly therefrom. The free floating shaft 124 has a chuck 127 affixed to its inner end and the chuck, in turn, has a resilient mounting ring 128 disposed in a groove in its face similarly to the embodiment shown in Fig. 4. An oil and dirt seal may be interposed between the journal 119 and the slidable and rotatable chuck 127. Such seal may take the form of a flexible bellows 129 as shown. In aligned and opposed relation to the free floating shaft 124 is the driving shaft 130 which is journaled in a sleeve 131 within the journal member 120. The shaft 130 bears a chuck 132 having a resilient ring 128 at its surface in opposed relation with the ring 128 of the chuck 127. The shaft 130 has an annular flange 133 which abuts against an annular flange 134 formed at the outer end of sleeve 131. Beyond the annular flange 133 is a reduced extension 135 of the shaft 130 to which is attached the pulley 77. The pulley has the same mounting mechanism as shown in the first embodiment of Fig. 4 which is adapted to hold firmly the cam member 81. The reduced extension 135 is journaled through the cap member 136 which, in turn, is bolted to the outside face of the journal 120 by means such as screws or bolts 137. Oil sealing rings 138 are placed at strategic positions in the journal 120 so as to prevent leakage of oil through the journal itself. An oil seal such as O-ring 139 is placed near the inner end of the journal 120 and a similar O-ring 140 is placed in annular relation between the reduced extension 135 and the opening through cap 136 as shown. A reduced passageway 141 communicates with a restricted area 142 surrounding the annular flange 133.

The reduced passageways or openings 123 and 141 are both in communication with a common source of fluid pressure. The lines to the source of pressure are indicated diagrammatically at 143 and 144 respectively. The line emanating from a source of constant fluid pressure (not shown) is indicated diagrammatically by the line 145. When fluid pressure is supplied from the line 145 to the divided lines 143 and 144, the fluid pressure is built up in both the journals 119 and 120. I prefer to use a lubricating type of oil for the fluid so that the bearings may be simultaneously lubricated and placed under pressure for mounting in clamped relation the lens blank 86. With the lens blank 86 in position as shown, the fluid pressure will be distributed equally to both the lines 143 and 144. The fluid passing through line 143 will flow into the bore 122, thus causing the shaft 124 to move forwardly in pressing relation through its chuck 127 with the lens blank 86. At the same time, fluid through line 144 enters the restricted passageway 141 and places the annular flange member 133 under fluid pressure. Since oil will seep about the flange and distribute itself thinly over the area of the larger portion of the shaft 130, the complete pressure from line 144 will not be applied to the cross sectional area of the shaft 130. Rather, the pressure applied will be the pressure per unit area multiplied by the difference in the cross sectional unit area between the enlarged shaft portion 130 and the smaller portion 135. It will be observed that the O-ring oil seals 139 and 140 prevent the escape of lubricating fluid through the ends of journal 120 while at the same time preserving the off-setting thrust forces necessary to counter-balance the thrust of the opposed floating shaft 124. To obtain the equalized pressure effect which is desired, I have selected the diameters of shaft 130 and shaft extension 135 so that their difference in area will be equal to the cross sectional area of the floating shaft 124. The hydraulic force at both ends thus creates a smoothly operating spindle assembly which will not be given a braking action by virtue of high force imposed upon the lens blank 86.

*Operation*

In the operation and adjustment of my edge grinder, I align the journals 25 and 26 so that the abrasive discs 31 and 35 are n extremely close clearance with each other, especially at the forward apex of their circumferential peripheries. When thus adjusted, the axes of the journals 25 and 26 together with the shafts 29 and 33 rotatably mounted therein substantially lie in a plane which is parallel to the upstanding mounting plate 11. The extended axes of the journals 25 and 26 are also substantially parallel with one another and are misaligned to a predetermined degree so as to cause the discs 31 and 35 to partially overlap one another and form the forwardly overlapping apex as previously described. The arrangement of the overlapping of the discs at the apex point is shown in detail in Fig. 6. As previously noted, the direction of rotation is preferably such that the disc 35 rotates in a counterclockwise direction as viewed in Fig. 1 and disc 31 rotates in a clockwise direction. The circumferential edges of the discs 31 and 35 therefore have a converging movement at the apex 35a as shown in Fig. 6. With the abrasive discs 31 and 35 thus positioned, the base 39 of the work holding mechanism W is retracted forwardly so that the mechanism W is in spaced relation with the discs 31 and 35.

Preliminary to use of the machine, the wedge member 42 is advanced with relation to the work holding base 39 by means of the threaded nut 45 so that the base 39 will slide forwardly and backwardly on the platform 36 without any side play or vertical movement. The knurled nut 87 is then screwed outwardly from the position shown in Fig. 4 until it engages the collar member 90 and then is further screwed outwardly until the spindle 84 together with its chuck 85 is retracted in spaced relation with respect to the opposed chuck 76. The workpiece such as lens blank 86 is then introduced between the resilient rings 97 at the outer grooved faces of the chucks 76 and 85 and the knurled nut 87 screwed inwardly until the resilient rings 97 firmly engage the lens blank 86. Various conventional centering instruments may be employed to properly position the lens blank with respect to the axis of the journals 73 and 74 since the lens must be maintained in fixed axial relation during the entire edge grinding operation. With the lens 86 thus properly axially aligned the nut 87 is screwed in fully thus putting a constant tension upon compression spring 91 and transmitting a corresponding compression between the chucks 85 and 76 with the lens blank 86 held rigidly therebetween. The two speed synchronous motor 98 may then be energized so as to transmit its lowest speed through pulley 101 to the pulley 77 via the connecting belt 102. The spindle 75 will then be caused to rotate together with the chuck member 76, the lens blank 86 and the chuck 85 which is journaled rotatably upon the end of the opposed spindle 84. The adjustable weight 112 on the arm 109 is preset at the proper position to impart rearward pressure of lens blank 86 against the apex 35a of the abrasive discs 31 and 35. The adjusting nut 51 at the forward end of the device is then turned so as to advance the entire work holding mechanism W in sliding manner upon the platform 36. As the work holding mechanism advances forwardly, the revolving lens blank 86 will come into contact with the rotating abrasive discs 31 and 35 at or adjacent the apex 35a. The adjusting screw 51 is advanced further until the weight arm 109 raises to some intermediate position at which it will have a working range in which to swing about the pivot 110. As the revolving lens blank 86 is brought against the apex 35a the pressure of each of the discs 31 and 35 will equalize against the sides of the lens 86 since the lens and spindles are mounted upon a shaft 63 having a vertical axis with respect to the work holding base 39. In other words, the lens blank 86 is free to float in sideways relation with respect to the apex 35a and to seek its own center responsive to equalize pressures at either side of the peripheral edge of the lens 86. The rough peripheral form of lens 86 may be of any approximate configuration such as that shown diagrammatically in dotted lines and marginally around the cam 81 of Fig. 8. It is understood, of course, that the final configuration of the lens blank 86 will necessarily either coincide with the peripheral configuration of the cam 81 or will be in symmetrical proportion therewith depending on the relative positioning of the abutment member 113. As the lens 86 revolves, its rough peripheral configuration will contact the apex 35a (or rather areas adjacent the apex 35a at the beginning of the operation) and the shaft 68 upon which the spindles are mounted will oscillate upon its axis to conform with the forward and rearward movements of the irregular periphery of the lens blank 86. It will be observed that the axis of rotation of the lens is radially mounted with respect to the axis of shaft 68 so as to provide for these forward and rearward movements of the lens while being ground in contact with both of the abrasive discs 31 and 35 at or near the converging and overlapping apex 35a. As the lens moves in and out during its revolving motion, the shaft 68 will impart radial movement to its arm 103 which extends forwardly therefrom as shown in Fig. 3. Movement of the lens 86 away from the abrasive discs 31 and 35 will cause the arm 103 to move downwardly in a slight arc which will, in turn, impart downward movement to the connecting arm 105 and to the short length of weight arm 109 which extends forwardly of the fulcrum or pivot point 110. The downward movement of connecting arm will, of course, impart a corresponding upward movement at the opposite end of weight arm 109 which bears the adjustable weight 112. The net effect of the movement will be to provide an even and constant pressure between the revolving lens 86 and the abrasive discs 31 and 35 regardless of the variations at the outer priphery of the blank.

Where the lens blank has a peripheral edge which lies entirely within a single plane, there will be very little side play of the lens 86 as it revolves in contact with the abrasive discs. Now, however, where the peripheral edge of the lens 86 forms the edge of a surface having a compound curvature, or in other words a sinuous edge, then the lens will have a tendency to oscillate laterally with respect to the apex 35a as well as backwardly and forwardly. Since the spindles and the lens blank are mounted upon the forward vertical axis through shaft 63, lens 86 can seek its own centering position during its revolution. The axis of revolution of the lens will thus move through a small arc radially spaced from the vertical axis through the shaft 63 while at the same time moving backwardly and forwardly through an arc, the axis of which is normal to the vertical axis. This normal axis lies horizontally within the shaft 68. It is understood, of course, that the terms vertical and horizontal are relative with respect to a horizontal base 10 and a vertical mounting plate 11. If the mounting structure be arranged at any other angle the angulation of the individual parts of the device can be likewise varied while still maintaining the relative angulation between the parts.

As the lens blank 86 continues to revolve in contact with the rotating abrasive discs 31 and 35, the ground edge will form an apex 86a as viewed in Fig. 6. It will also be observed that the areas of pressure will be equal and opposite, theoretically assuming a somewhat ovoid shape diagrammatically illustrated at 86b as shown in Fig. 7. The angulation and positioning of the discs 31 and 35 are shown in dotted lines. In order to prevent unequal pressures or gouging by one of the discs 31 and 35, I arrange the angulation of the lens edge with respect to the circumferential peripheries of the discs such that the centers of the pressure areas 86b at each beveled side of the apex 86a will be normal to the increment of the lens edge which is in the immediate vicinity of grinding contact between both of the abrasive discs 31 and 35. This normal relationship is indicated by the center line which passes through the centers of the pressure areas 86b at each side of the apex 86a as shown in Fig. 7. I have found that wherever an equal pressure relationship is not maintained, the workpiece such as lens blank 86 will tend to be cut more rapidly where the pressure is greater. Furthermore, there is a tendency for the workpiece to move away from the point of greater pressure towards the point of lesser pressure, thus often distorting the pattern of cutting or grinding. It is therefore my desire to maintain these pressure areas 86b in the aforesaid even and directly opposed relation to avoid uneven grinding of the workpiece. For the same reasons I prefer to rotate the discs 31 and 35 in the direction of the arrows shown in Fig. 6. The converging relationship of the discs assist in advancing the workpiece toward the apex 35a and at the same time provides equal and opposite grinding at the beveled edges at either side of the central line 86a. Where the disc 31 is rotated in the same direction as the disc 35 then there would be a tendency for the workpiece to move to one side or the other depending upon the direction of rotation. The resulting bevel would therefore be unequal and the edge 86a would tend to form more closely to one face of the workpiece than the other. I have further found that where the abrasive discs 31 and 35 rotate in diverging relation rather than converging relation that there is a tendency for the workpiece to chatter or to climb outwardly upon one or the other of the disc peripheries depending on which of the discs the lens fortuitously happened to first engage. This bad effect is cumulative since the more the workpiece climbs with one of the discs the less pressure it exerts on the other one, therefore tending to remain with the first mentioned disc and thereby become unevenly beveled as previously pointed out. To summarize, the ideal grinding condition which I have achieved contemplates a freely floating rotating contact of the workpiece with the converging circumferential edges of two abrasive discs which are so angularly disposed with respect to the edge increment of the workpiece in the immediate vicinity of its contact therewith that the areas of contact will have their centers aligned normally to the disposition of said increment. Another way of expressing the relationship is by comparing the center line through the aforesaid centers of pressure, the center line being parallel to the axis of rotation of the lens blank as it rotates upon its spindle members.

It will be observed that where a lens blank has a sinuous edge such as that appearing in Fig. 5, it is preferred to mount the lens so that the mean plane through the sinuous peripheral edge 86 is substantially normal to the plane which includes the axis about which the discs 31 and 35 rotate respectively. The mean plane is indicated by the center line in Fig. 5. As the sinuous edge 86a follows the apex 35a the axis of rotation of the workpiece will oscillate and cause the workholding mechanism to move about the vertical axis through shaft 63. Since the weight arm 109 is pivotally mounted to the rigid bracket members 111 the pointed end 106 of arm 105 during such movement must rock slightly in differential relation with respect to both the arms 103 and 109. Since the oscillating movement about the vertical shaft 63 is through a relatively small arc, the rocking action of arm 105 will not be great enough to introduce a noticeable variation of mechanical advantage. The reason for not swinging the entire weight arm 109 through the same arc with respect to the vertical axis through shaft 63 is that a certain degree of momentum would then be imparted to arm 109 and weight 112 which would tend to delay equalizing the pressure of the workpiece 86 upon one disc or the other as the sinuous edge 86a follows the apex 35a between the circumferential peripheries of discs 31 and 35.

As the grinding of the lens blank continues at the peripheral edge thereof the original configuration denoted by the diagrammatic dotted line position in Fig. 8 will be gradually worn down until the cam 81, which rotates together with the lens workpiece 86, will contact the pin abutment 116. As the grinding operation proceeds, the pin abutment 116 will be depressed with respect to the fixed abutment 113 until the cam edge finally contacts the fixed abutment 113. It is contemplated that the final configuration of the lens will be exactly determined by continuous revolution of the lens and cam with the cam in constant contact with the fixed abutment 113. It was noted previously that the synchronous motor 98 was capable of more than one speed in order to shorten the total time of edge grinding. It is preferred to operate during the initial stages at the lowest of the speeds. The reason for this is that the lens blank may have imperfections such as grooves or bumps at the edge thereof which require slow and careful treatment before the edge has progressed to a point where the grinding can proceed at a faster rate. It is presumed, of course, that a sufficient margin is provided upon the lens blank so that as the grinding nears completion, all such irregularities will be removed. The pin abutment 116 can therefore constitute a relative guiding member which will, when depressed to the surface of abutment 113 cause the microswitch 115 to be actuated and to throw the synchronous motor 98 into a higher speed. Since the portion of the lens edge corresponding to the particular cam surface which first comes into contact with abutment 113 is nearly ground or completely ground there is no further need to waste time during that portion of the revolution of the blank by continuing to revolve it at the slower of the motor speeds. I have found that considerable time can be saved in the automatic operation of an edge cutting apparatus by causing the workpiece to move at a faster rate whenever the cam edge contacts a preset abutment.

A further extension of my multiple speed edge grinder lies in adjusting the point of actuation of the microswitch 115 so that the abutting pin 116 will cause the actuation before the extending end thereof has been depressed all the way to the surface of the fixed abutting member 113. Thus, by way of example, the motor 98 may be caused to operate at a higher rate of speed and to thereby turn the lens at a faster rate when the cam periphery approaches the fixed abutting surface 113 within a predetermined degree. Thus, if the pin abutment 116 is set so as to cause speeding up of the motor 98 when it is depressed within $20/1000$ of an inch then the lens will rotate at the faster rate at every portion of its periphery during every revolution thereof where the pin 116 is depressed within the prescribed clearance. It will be noted that in this case grinding is continued for these portions even though the rotation is speeded up. As a consequence the margins of the lens which still must be ground down by a considerable degree are treated more slowly and therefore are ground more deeply for every complete revolution of the lens. An ideal situation prevails where the final configuration of the lens is almost perfectly formed by the time the cam actually rides upon the fixed abutting surface 113 to delineate the finished edge configuration. It is understood, of course, that all during the grinding process, the bevels at the peripheral edge 86 will be formed at each side of the center line 86a and that these bevels will be formed even though the edge 86 is sinuous in nature as in the case of the lens blank depicted in Fig. 5. It is further understood that the bevels do not necessarily have to form a complete apex or edge line 86a. Where so desired, the outer configuration of the lens may be first formed in conformity with the cam periphery selected and then beveled edges may be applied subsequently. In the latter case incomplete bevels may be formed leaving a central flat band instead of the ridge or apex 86a.

It may thus be seen that I have devised an extremely useful instrument for automatically edge grinding workpieces such as lenses, whether irregular or circular, and whether of compound curvature or uniform curvature, the device operating speedily and efficiently to bring a lens to its finished configuration including the desired peripheral shape as well as the desired beveled edge.

It will, of course, be understood that various changes may be made in the form, details, arrangement and proportions of the parts without departing from the scope of my invention.

What I claim is:

1. A method for simultaneously forming forward and rearward edge bevels on an optical lens which consists in revolving, each on its own axis, a pair of circular abrasive discs in partially overlapping close clearance, and revolving an optical lens with the peripheral edge thereof in simultaneous pressing contact with small areas respectively on the circular edges of both of said discs where said circular edges in their overlapping relation converge and with an arcuate increment of the peripheral edge of said lens, which is in the immediate vicinity of its contact with said discs, being disposed substantially normal to a line through the centers of pressure area between each of the respective discs and its contact with the lens edge.

2. A method for simultaneously forming forward and rearward edge bevels on an optical lens which consists in revolving each about its own axis two circular abrasive discs having opposed surfaces in close clearance and with their axes misaligned to a predetermined degree, revolving an optical lens and at the same time applying with controlled pressure the edge thereof to an apex of overlapping intersection of the circumferential edges of the two abrasive discs, and in simultaneous contact therewith while maintaining the angulation of the lens with respect to that of the discs so that the respective centers of pressure areas imposed by each of the discs upon the peripheral edge of the lens will lie in alignment substantially normal to the increment of the lens edge in pressing engagement therewith.

3. A method for simultaneously forming forward and rearward edge bevels on an optical lens which consists in revolving in opposite directions two circular abrasive discs each about its own axis, and having adjacent overlapping surfaces in close clearance and their axes misaligned to a predetermined degree, and revolving an optical lens while concurrently applying with controlled pressure the edge thereof against an apex of converging overlapping intersection of the circuferential edges of the two abrasive discs and in smultaneous contact with small opposed pressure areas and maintaining the angulation of the lens with respect to that of the discs so that the respective centers of said pressure areas between each of the discs and the peripheral edge of the lens will be aligned in substantially parallel relation with the axis of revolution of said optical lens.

4. A method for simultaneously forming forward and rearward edge bevels on an optical lens having a sinuous peripheral edge which consists in revolving, each on its own axis, a pair of circular abrasive discs in partially overlapping close clearance, revolving the sinuous peripheral edge of an optical lens in simultaneous pressing contact with the circular edges of both of said discs while maintaining the mean plane defined by said sinuous edge substantially at right angles to the plane which includes the axes of said circular discs.

5. A method for simultaneously forming forward and rearward edge bevels on an optical lens having a sinuous peripheral edge which consists in revolving each on its own axis, a pair of circular abrasive discs in partially overlapping close clearance, revolving the lens on an axis which pierces a medial portion of the lens, simultaneously bringing the peripheral edge of an optical lens of the class described and the simultaeous pressure contact with small adjacent areas of the circular edges of both of the discs and with an arcuate increment of the peripheral edge of said lens which is in the immedaite vincinity of its contact with said discs being disposed substantially normal to the line passing through the centers of said pressure areas between each of the respective discs and its contact with the lens edge, and concurrently therewith permitting shifting of said lens to maintain the normal relationship of the said line with the arcuate increment in the vicinity of said pressure contact.

6. A method for simultaneously forming forward and rearward edge bevels on an optical lens having a sinuous peripheral edge which consists in revolving, each on its own axis, a pair of circular abrasive discs in partially overlapping close clearance, revolving the lens on an axis which pierces a medial portion of the lens and concurrently bringing the peripheral edge of the optical lens into simultaneous pressing contact with small adjacent areas of the circular edges of both of the discs where the peripheral edges of the discs in overlapping relation converge and with the line passing through the centers of said adjacent areas being substantially parallel to the axis of revolution of said lens, and holding said lens during revolution and edge applying steps with freedom for tilting the axis of revolution of said lens on a tilting axis disposed perpendicular thereto and in spaced relation.

7. Apparatus for simultaneously grinding forward and rearward edge bevels on the periphery of an optical lens comprising, a supporting structure having a base and an upstanding mount secured thereto, a circular abrasive disc journaled for rotation upon said mount, a second circular abrasive disc likewise journaled for rotation upon said mount, said abrasive discs being disposed in overlapping relation and in close parallel clearance each with the other, a work holding mechanism mounted on said base and having a rotatable spindle for holding a lens in angular relation and in contact with the circular edges of both said discs, said work holding mechanism being pivotally mounted on an axis transverse with respect to said base for slight shifting movement and change in the angulation of the axis of said rotatable spindle to permit self-alignment of the rotating lens periphery with respect to the peripheral edges of said discs.

8. Apparatus for simultaneously grinding forward and rearward edge bevels on the periphery of an optical lens comprising, a supporting structure having a base and an upstanding mount secured thereto, a pair of circular abrasive discs journaled for rotation upon said mount, said abrasive discs having opposed circular peripheries in closely overlapping intersection each with the other, a work holding mechanism shiftably secured to said base for horizontal movement and having shiftably mounted thereon for vertical movement rotatable spindle means for holding a lens at a medial portion thereof with the peripheral edge of the lens free and uncovered, said spindle means being oriented with respect to said abrasive discs so that the longitudinal axis of said spindle means will be angulated intermediate a parallel relationship and a normal relationship with the respective axes of said discs, a resilient element constantly urging said rotatable spindle means and said lens toward the pair of circular abrasive discs whereby an optical lens rotating on said spindle means with its peripheral edge in contact with both of said discs at their overlapping intersection will be held thereagainst without exerting torque against the peripheral edge and so that the edge of said lens will be finally shaped and provided with a V-shaped peripheral bevel.

9. Apparatus for simultaneously grinding forward and rearward edge bevels on the periphery of an optical lens comprising, a pair of circular abrasive discs journaled upon a mounting structure in over-lapping close clearance one with the other, a work-holding mechanism secured upon said mounting structure and having a pair of rotatable jaws axially aligned for gripping in opposed relation a pre-ground optical lens, a drive mechanism for rotating said jaws and said lens, guide means interposed between said work-holding mechanism and said mounting structure responsive to rotation of the jaws and lens and defining the peripheral outline of a dual V-shaped edge in a finished optical lens, a speed change element mounted in alignment with said guide means and having a depressible abutment pin extending toward the guide means for engaging and disengaging during rotation of said jaws and lens, and a limit abutment also aligned with said guide means for defining the ultimate peripheral shape of said lens, said abutment pin extending forwardly of said limit abutment whereby to be contacted first by said guide means before engaging said limit abutment.

References Cited in the file of this patent

UNITED STATES PATENTS

| | | |
|---|---|---|
| 475,068 | Temple et al. | May 17, 1892 |
| 508,196 | Willson et al. | Nov. 7, 1893 |
| 1,452,917 | Kovacs | Apr. 24, 1923 |
| 1,659,964 | Schultz | Feb. 21, 1928 |
| 2,414,126 | Sevin | Jan. 14, 1947 |
| 2,618,106 | Long | Nov. 18, 1952 |
| 2,653,427 | Ellis | Sept. 29, 1953 |

FOREIGN PATENTS

| | | |
|---|---|---|
| 15,680 | Great Britain | Nov. 6, 1915 |